(12) United States Patent
Jannerstad et al.

(10) Patent No.: US 10,888,879 B2
(45) Date of Patent: Jan. 12, 2021

(54) SEPARATOR ARRANGEMENT FOR CLEANING GAS

(71) Applicant: ALFDEX AB, Landskrona (SE)

(72) Inventors: Ronny Jannerstad, Tullinge (SE); Mats-Örjan Pogén, Billeberga (SE); Pedro Hernandez Fraczek, Årsta (SE)

(73) Assignee: ALFDEX AB, Landskrona (SE)

( * ) Notice: Subject to any disclaimer, the term of this patent is extended or adjusted under 35 U.S.C. 154(b) by 399 days.

(21) Appl. No.: 15/762,936

(22) PCT Filed: Oct. 4, 2016

(86) PCT No.: PCT/EP2016/073633
§ 371 (c)(1),
(2) Date: Mar. 23, 2018

(87) PCT Pub. No.: WO2017/063914
PCT Pub. Date: Apr. 20, 2017

(65) Prior Publication Data
US 2018/0264485 A1    Sep. 20, 2018

(30) Foreign Application Priority Data
Oct. 14, 2015 (EP) .................................. 15189745

(51) Int. Cl.
*B01D 45/08* (2006.01)
*B01D 45/14* (2006.01)
(Continued)

(52) U.S. Cl.
CPC .............. *B04B 5/12* (2013.01); *B01D 45/08* (2013.01); *B01D 45/14* (2013.01); *B04B 5/005* (2013.01);
(Continued)

(58) Field of Classification Search
CPC .......... B01D 45/08; B01D 45/14; B04B 11/02; B04B 2005/125; B04B 5/005; B04B 5/12;
(Continued)

(56) References Cited

U.S. PATENT DOCUMENTS

| 4,311,494 A | 1/1982 | Conner et al. |
| 4,316,728 A * | 2/1982 | Caesar .................. B01D 45/10 |
| | | 96/228 |

(Continued)

FOREIGN PATENT DOCUMENTS

| CN | 1961139 A | 5/2007 |
| CN | 103470342 A | 12/2013 |

(Continued)

OTHER PUBLICATIONS

European Search Report, issued in Priority Application No. 15189745. 1, dated Apr. 28, 2016.

(Continued)

*Primary Examiner* — Cabrena Holecek
(74) *Attorney, Agent, or Firm* — Birch, Stewart, Kolasch & Birch, LLP (57) ABSTRACT

An arrangement for cleaning gas includes a centrifugal separator and pre-separation unit. The centrifugal separator includes a stationary casing, enclosing a separation space through which a gas flow is permitted, a gas inlet extending through the stationary casing and permitting supply of the gas from the pre-separation unit, a rotating stack of separation disks, a gas outlet and a drainage outlet for discharging separated liquid impurities. The pre-separation unit is arranged upstream of said inlet of said centrifugal separator, and it comprises a pre-separation inlet having a cross-sectional area A2 and permitting supply of the gas to be cleaned. A2 is larger than the cross-sectional area A1 of the inlet to the separation space of the centrifugal separator. A (Continued)

pre-separation outlet permits supply of gas from the pre-separation unit to the gas inlet of the centrifugal separator. A first chamber and a second chamber arranged downstream thereof are separated by at least one intermediate wall including at least one through-hole.

20 Claims, 4 Drawing Sheets (51) Int. Cl.
- B04B 11/02 (2006.01)
- B04B 5/00 (2006.01)
- B04B 5/12 (2006.01)
- B04B 7/02 (2006.01)
- F01M 13/04 (2006.01)

(52) U.S. Cl.
CPC ............... *B04B 7/02* (2013.01); *B04B 11/02* (2013.01); *F01M 13/04* (2013.01); *B04B 2005/125* (2013.01); *F01M 2013/0422* (2013.01)

(58) Field of Classification Search
CPC ... B04B 7/02; F01M 13/04; F01M 2013/0422
See application file for complete search history.

(56) References Cited

U.S. PATENT DOCUMENTS

| | | | |
|---|---|---|---|
| 5,912,368 A | 6/1999 | Satarino et al. | |
| 7,022,163 B2 | 4/2006 | Olsson et al. | |
| 7,850,754 B2 | 12/2010 | Ruppel et al. | |
| 8,657,908 B2 | 2/2014 | Eliasson | |
| 2008/0264251 A1 | 10/2008 | Szepessy | |
| 2009/0025562 A1* | 1/2009 | Hallgren | B01D 45/14 96/216 |
| 2010/0180854 A1 | 7/2010 | Baumann et al. | |
| 2012/0031270 A1* | 2/2012 | Carlsoon | B04B 9/06 95/270 |
| 2014/0033922 A1 | 2/2014 | Peck et al. | |
| 2014/0165977 A1 | 6/2014 | Copley et al. | |

FOREIGN PATENT DOCUMENTS

| | | |
|---|---|---|
| FR | 2 426 491 A1 | 12/1979 |
| GB | 2 036 589 B | 8/1982 |
| KR | 10-2008-0020620 A | 3/2008 |
| KR | 10-2011-0111530 A | 10/2011 |
| SU | 652954 A1 | 3/1979 |
| WO | WO 2004/001200 A1 | 12/2003 |
| WO | WO 2005/021938 A1 | 3/2005 |
| WO | WO 2005/123261 A1 | 12/2005 |
| WO | WO 2006/132577 A1 | 12/2006 |
| WO | WO 2007/020084 A2 | 2/2007 |
| WO | WO 2007/094725 A1 | 8/2007 |
| WO | WO 2013/186337 A1 | 12/2013 |

OTHER PUBLICATIONS

International Search Report, issued in PCT/EP2016/073633, dated Dec. 21, 2016.

Written Opinion of the International Searching Authority, issued in PCT/EP2016/073633, dated Dec. 21, 2016.

Korean Office Action dated Aug. 26, 2019, for Korean Patent Application No. 10-2018-7013181, with English translation.

English translation of the Russian Notice of Allowance dated Jan. 10, 2019 for Application No. 2018115698.

* cited by examiner

SEPARATOR ARRANGEMENT FOR CLEANING GAS

FIELD OF THE INVENTION

The present invention relates to the field of centrifugal separators for cleaning a gas containing liquid impurities. In particular, the present invention relates to cleaning crankcase gases of a combustion engine from oil particles.

BACKGROUND OF THE INVENTION

It is well known that a mixture of fluids having different densities may be separated from one another through use of a centrifugal separator. One specific use of such a separator is in the separation of oil from gas vented from a crankcase forming part of an internal combustion engine.

With regard to this specific use of separators, there can be a tendency for the high pressure gas found in the combustion chambers of an internal combustion engine to leak past the associated piston rings and into the crankcase of the engine. This continuous leaking of gas into the crankcase can lead to an undesirable increase of pressure within the crankcase and, as a consequence, to a need to vent gas from the casing. Such gas vented from the crankcase typically carries a quantity of engine oil (as droplets or a fine mist), which is picked up from the reservoir of oil held in the crankcase.

In order to allow vented gas to be introduced into the inlet system without also introducing unwanted oil (particularly into a turbocharging system wherein the efficiency of the compressor can be adversely affected by the presence of oil), it is necessary to clean the vented gas (i.e. to remove the oil carried by the gas) prior to the gas being introduced into the inlet system. This cleaning process may be undertaken by a centrifugal separator, which is mounted on or adjacent the crankcase and which directs cleaned gas to the inlet system and directs separated oil back to the crankcase. An example of such a separator is disclosed e.g. in U.S. Pat. No. 8,657,908.

However, if the polluted gas to be cleaned comprises a too high content of oil, such as a large amount of large and heavy oil particles, the separation efficiency in the centrifugal separator may be decreased.

There is thus a need in the art for improved and more convenient cleaning arrangements for gas comprising liquid impurities, such as oil.

SUMMARY OF THE INVENTION

A main object of the present invention is to provide an improved separator arrangement for separating polluted gas.

As a first aspect of the invention, there is provided a separator arrangement for cleaning gas containing contaminants comprising a centrifugal separator and a pre-separation unit, wherein the centrifugal separator comprises a stationary casing, enclosing a separation space through which a gas flow is permitted, a gas inlet extending through the stationary casing and permitting supply of the gas from the pre-separation unit, a rotating member comprising separation members arranged in the separation space and being arranged to rotate around an axis (X) of rotation, a drive member, for rotating the rotating member, a gas outlet configured to permit discharge of cleaned gas and comprising an outlet opening through a wall of the stationary casing, and a drainage outlet configured to permit discharge of liquid impurities separated from the gas to be cleaned;

and wherein the pre-separation unit is arranged upstream of the gas inlet of the centrifugal separator, and the pre-separation unit comprises a pre-separation inlet having a cross-sectional area A2 and permitting supply of the gas to be cleaned, wherein the cross-sectional area A2 is larger than the cross-sectional area A1 of the gas inlet of the centrifugal separator;

a pre-separation outlet for permitting supply of gas from the pre-separation unit to the gas inlet of the centrifugal separator;

a first chamber and a second chamber arranged downstream of the first chamber, wherein the chambers of the pre-separation unit are separated by at least one intermediate wall comprising at least one through hole.

The contaminants in the gas may comprise liquid impurities, such as oil, and soot.

Consequently, the separator arrangement may be for separating liquid impurities, such as oil, from gas. The gas may be crankcase gas of a combustion engine. However, the separator arrangement may also be suitable for cleaning gases from other sources, for instance the environment of machine tools which frequently contains large amounts of liquid impurities in the form of oil droplets or oil mist. The separator arrangement comprises two units, a centrifugal separator, mainly for separating liquid impurities of a small volume from the gas, such as oil mist, and a pre-separation unit, which is arranged upstream of the centrifugal separator and mainly for separating liquid impurities of a larger volume, such as larger liquid particles of oil. The pre-separation unit may thus be for separation of large and medium sized particles having a diameter of above approximately 10 µm. Thus, a pre-separation function is added to the centrifugal separator. This provides mounting the separator arrangement as a single unit direct on engine block. This saves both space and cost for the engine manufacturer. As an alternative, the pre-separation unit may be partly or fully integrated with the separator, e.g. so that the stationary casing of the separator also forms a casing of the pre-separation unit, such as an outer wall of the pre-separation unit, so that the separator arrangement forms a single unit.

Consequently, the pre-separation unit may facilitate separation of liquid impurities from the gas since it has a cross-sectional area at the inlet that is larger than the cross-sectional area of the inlet to the separation space of the centrifugal separator. Due to this relation of cross-sectional areas in combination with the arrangement of the chambers, pressure-drop, gas velocity and turbulence may be kept low in the pre-separation unit so that larger oil particles may be separated when hitting the inner walls and intermediate walls of the pre-separation unit.

In conventional set-ups, liquid oil that may be present on inner surfaces of e.g. the motor may transported along inner surfaces of the motor to the centrifugal separator. Such liquid oil may also be present on inner surfaces in e.g. the crankcase of an engine or on inner surfaces of the turbine house of the centrifugal separator if the separator is driven by a turbine wheel. The presence of such liquid oil in the separator may reduce the separation capacity of the separator. However, with the separator arrangement of the present disclosure, such liquid oil may be trapped by the pre-separation unit and consequently, the risk of such liquid oil entering the centrifugal separator may be reduced.

The stationary casing of the centrifugal separator may comprise a surrounding side wall, and first and second end walls. The stationary casing may have a cylindrical shape with circular cross-section having a radius R from the axis (X) of rotation to the surrounding side wall. This radius R may be constant at least with respect to a major part of the circumference of the surrounding side wall. The stationary casing may also be slightly conical. The first and second end walls may thus form an upper end wall and a lower end wall of the cylindrical shaped casing.

The gas inlet of the centrifugal separator may be located through the first end wall or through the surrounding side wall close to the first end wall, thus at the top of the separator such that gas entering through the gas inlet enters the separation space whereas the drainage outlet may be located in the second end wall, e.g. at the bottom of the separator. The cross-sectional area of the gas inlet is denoted A1.

In embodiments, A1 is substantially the same as the cross sectional area to the separation space, which is the area to the spaces or gaps between the discs of the disc stack. A1 may also be larger than the cross sectional area to the separation space.

The separation members of the rotating member are examples of surface-enlarging inserts that promote separation of contaminants from the gas. The separation members may be a stack of separation discs. The separation discs of the stack may be frustoconical. A frustoconical disc may have a planar portion extending in a plane that is perpendicular to the axis of rotation, and a frustoconical portion that may extend upwards or downwards. The planar portion may be closer to the rotational axis than the frustoconical portion. Further, the discs of the stack may be radial discs, in which substantially the whole disc extends in a plane that is perpendicular to the axis of rotation.

It is also to be understood that the separation members, such as separation discs, not necessarily have to be arranged in a stack. The separation space may for example comprise axial discs, or plates that extend around the axis of rotation. The axial discs or plates may be planar, i.e. extending in planes that are parallel to the axis of rotation. The axial discs or plates may also have a slightly or significantly curved shape, such as an arcuate or spiral shape, as seen in a radial plane.

During operation, gas to be cleaned may be directed centrally through the separation members, such as centrally through the stack of separation discs. In such a set-up, the rotating member may further define a central space formed by at least one through hole in each of the separation discs. This central space is connected to the gas inlet and configured to convey the gas to be cleaned from the gas inlet to the gaps of the stack of separation discs.

In such case, the cross sectional area to the separation space is the sum of the areas of the through holes in the uppermost disc in the disc stack.

A separation disc may comprise a central, essentially flat portion perpendicular to the axis of rotation. This portion may comprise the through holes that form the central space. A separation disc may further comprise a conical portion that extends in a direction that is not perpendicular to the axis of rotation.

The central space may thus be formed by the through holes of the flat portions, and the cross-sectional area to the separation space may hence be the sum of the through holes of the flat portions of the upper separation disc of the disc stack.

The drive member may for example comprise a turbine wheel, rotated by means of an oil jet from the lubrication oil system of the combustion engine or a free jet wheel comprising a blow-back disk. However, the drive member may also be independent of the combustion engine and comprise an electric motor, a hydraulic motor or a pneumatic motor.

The drainage outlet of the centrifugal separator may be formed by a number of spot shaped through holes of the stationary casing. The drainage outlet may be arranged centrally in an end wall opposite the end wall through which, or at which, the inlet is arranged. The drainage outlet may be arranged at the axis of rotation or centered on the axis of rotation. The drainage outlet may also be in an annular collection groove at the inner end wall of the stationary casing.

The pre-separation unit has a pre-separation inlet for permitting supply of the gas to be cleaned into the pre-separation unit. The cross-sectional area of the pre-separation inlet, denoted A2, is larger than the cross-sectional area of the gas inlet of the centrifugal separator, denoted A1. A2 may be more than 10% larger, such as more than 25% larger, such as more than 50% larger, or such as more than 100% larger, than A1. This mainly depends on constructional limits.

Furthermore, the pre-separation unit comprises a first and a second chamber, wherein the second chamber is arranged downstream of the first chamber, i.e. closer to the pre-separation outlet.

The chambers of the pre-separation unit are arranged for permitting through flow of gas to be cleaned through the pre-separation unit, i.e. the gas is led from the pre-separation inlet, through the chambers of the pre-separation unit and then out of the pre-separation outlet on its way to the centrifugal separator.

The chambers of the separation unit are delimited by intermediate walls, i.e. inner walls of the pre-separation unit. The intermediate walls comprises through holes, and when polluted gas hits the walls, large pollutant particles may be separated from the gas, whereas gas may flow to a chamber downstream via a through hole. An intermediate wall comprising at least one through hole may be a baffle extending out from an inner wall into the flow path of the gas. The through hole is thus then part of the flow path that is not obscured by the baffle. Such a baffle or intermediate wall may thus also separate one chamber from another.

In embodiments of the first aspect, the second chamber has a larger volume than the first chamber. If the second chamber has a larger volume than the first, the lifting force on large and medium-sized oil particles may be reduced. The oil particles may then e.g. fall to the bottom of the second chamber, from which they may be drained from the pre-separation unit.

In embodiments of the first aspect, the pre-separation unit further comprises a drainage outlet for oil that has been separated in the chambers of the pre-separation unit.

The drainage outlet may be the same as the pre-separation inlet.

In embodiments of the first aspect, the drive member of the centrifugal separator comprises a turbine wheel arranged in a turbine house of the centrifugal separator, and wherein the pre-separation inlet faces the turbine house such that gas to be cleaned is led from the turbine house to the pre-separation unit.

Thus, the turbine wheel may be arranged to be rotated by means of an oil jet from the oil system of the combustion engine. The pre-separation unit may thus be integrated with the turbine house, and gas to be cleaned in the separator arrangement may thus be led from the turbine house directly to a chamber of the pre-separation unit via the pre-separation inlet. The turbine house may be arranged axially below the stationary casing of the centrifugal separator. Further, the drainage outlet of the centrifugal separator may be arranged so that separated oil is drained to the turbine house.

In embodiments of the first aspect, the separator arrangement is a single, detachable unit. Thus, the complete separator arrangement may be a single, compact unit that may be mounted and detached as a single unit on an engine. This may save both cost and space.

In embodiments of the first aspect, the second chamber extends in the same direction as the axis (X) of rotation.

The separator arrangement may be arranged for mounting on an engine such that the rotational axis X is vertical. Then, the second chamber will also extend in the vertical direction, i.e. such that the flow path of gas through the second chamber is in the vertical direction. This further facilitates separation of heavier liquid impurities from the gas, i.e. the gravitation will further reduce the lifting force on such large and medium sized particles.

In embodiments of the first aspect, at least one intermediate wall of the pre-separation unit comprises at least one drainage hole for separated liquid impurities, wherein the at least one drainage hole has a cross-sectional area that is smaller than the through hole of the intermediate wall.

Thus, the drainage hole is for draining separated oil from a chamber to a chamber located upstream. In this way, oil separated from different chambers may be drained from the same drainage outlet of the pre-separation unit.

In embodiments of the first aspect the pre-separation inlet is arranged in a wall of the first chamber and the pre-separation outlet is arranged in a wall of the second chamber. Thus, the first chamber may be adjacent to the pre-separation inlet and the second chamber may be adjacent to the pre-separation outlet.

Furthermore, the pre-separation unit may comprise a third chamber arranged between the first and second chambers.

It is also to be understood that the pre-separation unit may comprise even further chambers arranged between the first and second chambers.

As an example, the third chamber may have a volume that is larger than the volume of the first chamber but smaller than the volume of the second chamber.

The chambers of the pre-separation unit may thus be arranged so that a chamber has a larger volume than the volume of the chamber located upstream. In this way, the gas velocity may decrease during flow through the pre-separation unit.

As an example, the second chamber may be cone-shaped so that the inner cross-sectional area decreases in the downstream direction.

If the pre-separation outlet is arranged in a wall of the second chamber, then such pre-separation outlet may be arranged in the narrowest portion of the cone. A cone-shaped second chamber may thus facilitate a smooth transition from the pre-separation unit to the inlet of the centrifugal separator.

As a further example, the intermediate wall delimiting the second chamber and the chamber upstream of the second chamber is cone-shaped and comprises a through hole for gas in the narrowest portion of the cone-shape, and wherein the intermediate wall extends into the second chamber.

Such a cone-shaped intermediate wall may aid in decreasing the velocity of the gas as it enters the cone-shaped second chamber, thereby facilitating removal of e.g. oil particles from the gas.

As a second aspect of the invention, there is provided a pre-separation unit for a centrifugal separator for cleaning gas containing contaminants, the pre-separation unit comprising a pre-separation inlet having a cross-sectional area A2 and permitting supply of the gas to be cleaned, a pre-separation outlet having a cross-sectional area A3 for permitting supply of gas from the pre-separation unit to the inlet of the centrifugal separator, wherein cross-sectional area A2 is larger than cross-sectional area A3, at least a first chamber and a second chamber arranged downstream of said first chamber, wherein the first and second chambers are arranged for permitting through flow of gas through the pre-separation unit, and wherein the second chamber has a larger volume than the first chamber so that all chambers for permitting through flow of gas through the pre-separation unit are arranged so that a chamber has a larger volume than the volume of the adjacent chamber located upstream, and wherein the chambers of the pre-separation unit are separated by at least one intermediate wall comprising at least one through hole.

Terms and definitions used in relation to the second aspect of the invention are as discussed in relation to the first aspect of the invention above. Furthermore, the pre-separation unit may be as discussed in any example and embodiment related to the pre-separation unit of the first aspect above.

The pre-separation unit of the second aspect thus provides a unit that may be mounted on an existing centrifugal separator for cleaning gas, such as crankcase gas. Since the cross-sectional area A2 of the inlet is larger than the cross-sectional area A3 of the outlet, gas velocity is kept low within the pre-separation unit, thereby facilitating separation of impurities from the gas.

The pre-separation outlet may be arranged for connection with the inlet of a centrifugal separator, such as a centrifugal for separating crankcase gas.

As a third aspect of the invention, there is provided a method for cleaning a gas containing contaminants comprising the steps of providing a separator arrangement according to the first aspect above;

introducing gas containing contaminants into the pre-separation inlet of the pre-separation unit of the separator arrangement; and discharging cleaned gas through the gas outlet of the centrifugal separator and discharging contaminants separated from the gas through the drainage outlet of the centrifugal separator.

Terms and definitions used in relation to the second aspect of the invention are as discussed in relation to the first aspect of the invention above The step of providing a centrifugal separator also comprises rotating the rotating member of the centrifugal separator.

The gas may be introduced at a blow-by rate of at least 200 litres per minute (lpm), such as at least 400 lpm, such as about 500 lpm.

The method may further comprise discharging contaminants separated in the pre-separation unit through a drainage outlet of the pre-separation unit.

In embodiments of the third aspect, the gas containing contaminants is crankcase gas of a combustion engine and the contaminants comprise oil.

DETAILED DESCRIPTION

The separator arrangement and method according to the present disclosure will be further illustrated by the following description with reference to the accompanying drawings.

Figure 1:
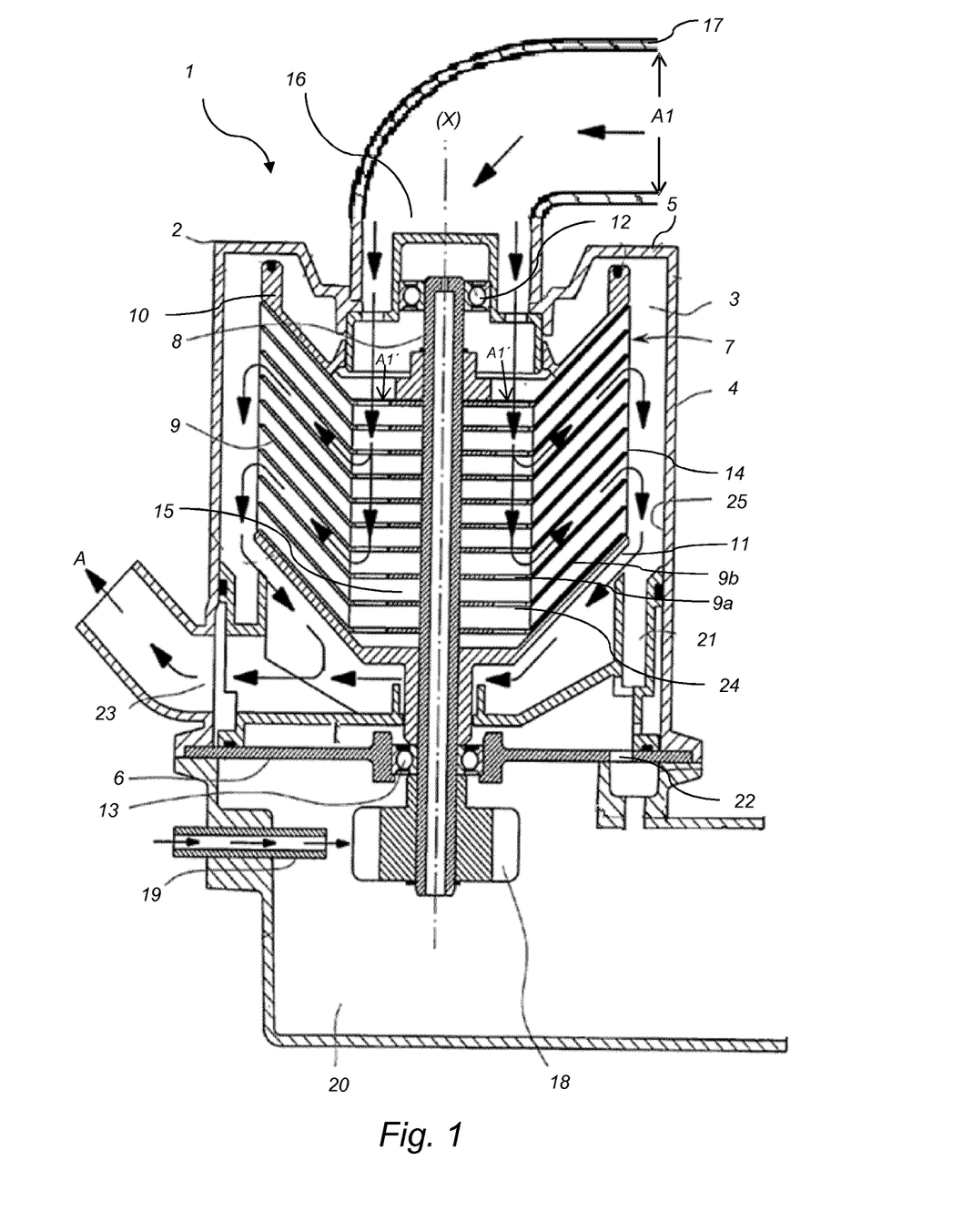
FIG. 1 shows a section of an embodiment of a centrifugal separator.

FIG. 1 shows a section of a centrifugal separator 1 of the separator arrangement. The centrifugal separator 1 comprises a stationary casing 2, which is configured to be mounted to a combustion engine (not disclosed), especially a diesel engine, at a suitable position, such as on top of the combustion engine or at the side of the combustion engine.

It is to be noted that the centrifugal separator 1 is also suitable for cleaning gases from other sources than combustion engines, for instance the environment of machine tools which frequently contains large amounts of liquid impurities in the form of oil droplets or oil mist.

The stationary casing 2 encloses a separation space 3 through which a gas flow is permitted. The stationary casing 2 comprises, or is formed by, a surrounding side wall 4, a first end wall 5 (in the embodiments disclosed an upper end wall) and a second end wall 6 (in the embodiments disclosed a lower end wall).

The centrifugal separator comprises a rotating member 7, which is arranged to rotate around an axis x of rotation. It should be noted that the stationary casing 2 is stationary in relation to the rotating member 7, and preferably in relation to the combustion engine to which it may be mounted.

The stationary casing 2 has a radius from the axis x of rotation to the surrounding side wall 4 that is constant at least with respect to a major part of the circumference of the surrounding side wall 4. The surrounding side wall 4 thus has a circular, or substantially, circular cross-section.

The rotating member 7 comprises a spindle 8 and separation members in the form of a stack of separation discs 9 attached to the spindle 8. All the separation discs 9 of the stack of separation discs 9 are provided between a first end plate 10 (in the embodiment disclosed an upper end plate) and a second end plate 11 (in the embodiment disclosed a lower end plate).

The spindle 8, and thus the rotating member 7, is rotatably supported in the stationary casing 2 by means of a first bearing 12 (in the embodiment disclosed as an upper bearing) and a second bearing 13 (in the embodiments disclosed as query a lower bearing).

The separation discs 9 are frusto-conical and extend outwardly and upwardly from the spindle 8. The separation discs thus comprise a flat portion 9a, which extend perpendicularly to the axis of rotation X, and a conical portion 9b, that extend outwardly and upwardly from the flat portion 9a.

It should be noted that the separation discs 9 could also extend outwardly and upwardly, or even radially.

The separation discs 9 are provided at a distance from each other by means of distance members (not disclosed) in order to form gaps 14 between adjacent separation discs 9, i.e. a gap 14 between each pair of adjacent separation discs 9. The axial thickness of each gap 14 may e.g. be in the order of 1-2 mm.

The separation disc 9 may be made of plastics or metal. The number of separation discs 9 is normally higher than indicated in FIG. 1 and may be for instance 50 to 100 separation discs 9 depending of the size of the centrifugal separator.

The rotating member 7 defines a central space 15. The central space 15 is formed by a hole in each of the separation discs 9. In the embodiments of FIG. 1, the central space 15 is formed by a plurality of through holes 24, each extending through the first end plate 10 and through each of the separation discs 9, but not through the second end plate 11. The through holes are arranged in the flat portions 9a of the separation discs.

A through hole 24 has the area A1', and the cross-sectional area to the inlet of the separation space is the sum of all A1' in the upper disc in the stack of separation discs in FIG. 1. The separation discs have in this embodiment the same shape, i.e. A1" is the same throughout the disc stack.

The flat portion 9a of a disc may have large through holes, so that the area A1 is substantially the same as the cross-sectional area of the flat portion 9a.

The centrifugal separator 1 comprises a gas inlet 16 for the supply of the gas to be cleaned. The gas inlet 16 extends through the stationary casing 2, and more precisely through the first end wall 5. The gas inlet 16 communicates with the central space 15 so that the gas to be cleaned is conveyed from the inlet 16 via the central space 15 to the gaps 14 of the stack of separation discs 9. The gas inlet 16 is configured to communicate with the crankcase of the combustion engine, or any other source, via an inlet conduit 17 permitting the supply of crankcase gas from the crankcase to the gas inlet 16 and further to the central space 15 and the gaps 14 as explained above. The gas inlet 16 has a cross-sectional area denoted A1 that is the same as the cross-sectional area of the inlet conduit 17.

The centrifugal separator 1 further comprises a drive member 18 for rotating the rotating member 7. The drive member comprises in this embodiment a turbine wheel that is arranged in a turbine house 20 of the centrifugal separator 1. During operation, the turbine wheel is rotated by means of an oil jet from the oil system of the combustion engine. The oil jet is delivered through nozzle 19. Alternatively, the drive member 18 may be independent of the combustion engine and comprise an electric motor, a hydraulic motor or a pneumatic motor.

The centrifugal separator comprises a drainage outlet 22 configured to permit discharge of liquid impurities separated from the gas and a gas outlet 23 configured to permit discharge of cleaned gas. The liquid impurities of the gas will be separated from the gas in the gaps 14, and the cleaned gas will be conveyed out of the gaps 14 to the separation space 3 and further to the gas outlet 23. The path of the gas through the centrifugal separator is shown by arrows "A" in FIG. 1. The heavy constituents flow on the inner wall surface 25 of the surrounding side wall 4 down into an annular collection groove 21 and out through the drainage outlet 22 into the turbine house 20. However, the drainage outlet 22 may also be in the form of through holes arranged centrally in the lower end wall 6, so that separated liquid impurities flow through the second bearing 13 down into the turbine house 20.

Figures 2, 3:
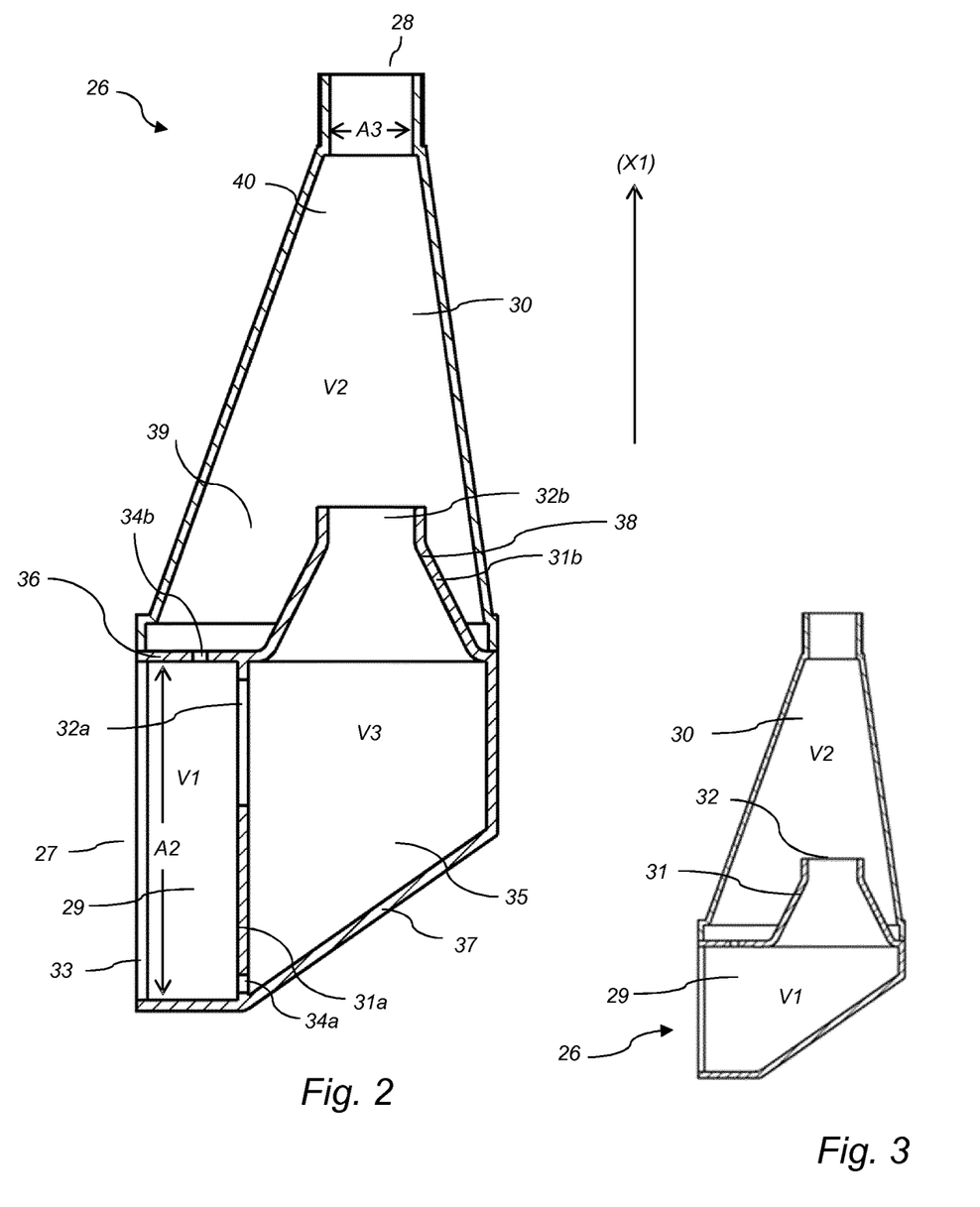
FIG. 2 shows a section of an embodiment of a pre-separation unit.
FIG. 3 shows a section of a further embodiment of a pre-separation unit.

FIG. 2 shows a section of a pre-separation unit 26 that may be used in the separator arrangement. The pre-separation unit 26 comprises a first chamber 29, a second chamber 30 and a third chamber 35 arranged in between the first and second chambers. The pre-separation inlet 27 is arranged in an outer wall to the first chamber 29, whereas the pre-separation outlet 28 is arranged in an outer wall of the second chamber 30. The cross-sectional area of the pre-separation inlet is A2, whereas the cross-sectional area of the pre-separation outlet is A3. The cross-sectional area A2 is larger than cross-sectional area A3, such as more than two times the area of A3, such as more than four times the area of A3. The chambers of the pre-separation unit 26 are separated by intermediate walls. In this embodiment, intermediate wall 31a separates the first chamber 29 and the third chamber 35, and intermediate wall 31b separates the third chamber 35 and the second chamber 30. Also a part 36 of the intermediate wall 31b separates the first chamber 29 from the second chamber 30. The intermediate walls have through holes for gas containing liquid impurities to pass through between the chambers. Through hole 32a is arranged in intermediate wall 31a, whereas through hole 32b is arranged in intermediate wall 31b. Through hole 32a is arranged axially in the upper part of the intermediate wall 31a, and may have a large cross-sectional area, such as having an area that is larger than 10% of the area of intermediate wall 31a, such as larger than 25% of the area of intermediate wall 31a.

Furthermore, there are drainage holes arranged in the intermediate walls so that separated liquid impurities may be drained from the chambers of the pre-separation unit 26. The cross-sectional area of a drainage hole is smaller than the cross-sectional area of a through hole for gas arranged in the same intermediate wall, such as more than three times smaller, such as more than five times smaller.

Drainage hole 34a is arranged in intermediate wall 31a so that separated liquid impurities may be drained from the third chamber 35 to the first chamber 29. A part 37 of the outer wall of the second chamber 35 is further tilted towards drainage hole 34a to facilitate transport of separated liquid impurities towards the drainage hole 34a. Further, drainage hole 34b is arranged in the part 36 of intermediate wall 31b that separates the second chamber 30 from the first chamber 29, so that separated liquid impurities may be drained from the second chamber 30 to the first chamber 29. There may also be drainage holes in intermediate wall 31b between the second and third chambers, so that separated liquid impurities in the second chamber 30 is drained to the first chamber 29 via the third chamber 35. There is also a drainage outlet 33 from the pre-separation unit 26 to drain separated liquid impurities from the pre-separation unit 26. In this embodiment, the drainage outlet 33 is the same as the pre-separation inlet 27.

The second chamber 30 has further the form of a cone, so that the inner cross-sectional area decreases in the downstream direction. The pre-separation unit is arranged so that the cone-shaped second chamber 30 extends in direction X1. The term "axially" in relation to the pre-separation unit thus refers to the axial direction of X1. The second chamber 30 may thus be regarded as having an axially lower part 39 and an axially upper part 40, wherein the axially upper part is downstream of the axially lower part, i.e. located closer to the pre-separation outlet. The cross-sectional area in the bottom of second chamber 30, i.e. in the axially lower part 39, is larger than the cross-sectional area of the axially upper part 40. The cross-sectional area decreases gradually in the downstream or axial direction in the cone-formed second chamber. Furthermore, part 38 of the intermediate wall 31b that delimits the second chamber 30 and the third chamber 35 is cone-shaped in itself and the through hole 32b for gas in arranged the narrowest portion of the cone-shape. The cone-shaped part 38 of intermediate wall 31b extends into the second chamber 30.

Furthermore, the volume of the chambers of the pre-separation unit decreases in the downstream direction. This means that if the first chamber has volume V1, the third chamber has volume V3 and the second chamber has volume V2, then V1<V2<V3.

During operation, gas containing liquid impurities such as oil enters the pre-separation unit 26 via the pre-separation inlet 27 to the first chamber 29. A large part of the larger oil particles and pure oil will hit the inner walls and the intermediate wall 31a and leave the pre-separation unit 26 via the large drainage outlet 33. Gas flow will then enter the third chamber 35 via through hole 32a. This opening is large to keep pressure-drop and gas velocity low. The larger volume V3 of the third chamber reduces the lifting force on the large and medium-sized oil particles which will fall to the bottom and be drained via the smaller drainage hole 34a to the first chamber 30 and further out via drainage outlet 33. Gas flow will then enter the cone-shaped second chamber 30, in which small particles will fall to the bottom due to reduction of lifting power. Oil accumulated in the second chamber 30 is evacuated via drainage hole 34b to the first chamber 29 and further out via drainage outlet 33. Gas having a reduced amount of liquid impurities may then leave the pre-separation outlet 28.

During operation, the blow by rate may be more than 200 lpm, such as more than 400 lpm, such as about 500 lpm.

In the embodiment shown in FIG. 2, the pre-separation unit comprises three chambers. However, the pre-separation unit may comprise more than three chambers or it may also only contain a first and a second chamber. Such an embodiment is shown in FIG. 3. The pre-separation unit 26 is almost identical to the pre-separation unit of FIG. 2, with the exception that it comprises only a first chamber 29 having volume V1 and a second chamber 30 having volume V2, in which V2>V1. Further, the first and second chamber s are delimited by intermediate wall 31 having a through hole 32 for gas.

The pre-separation unit may be integrated with the centrifugal separator in different ways depending on for instance available space for installation to form a separator arrangement.

Figure 4:
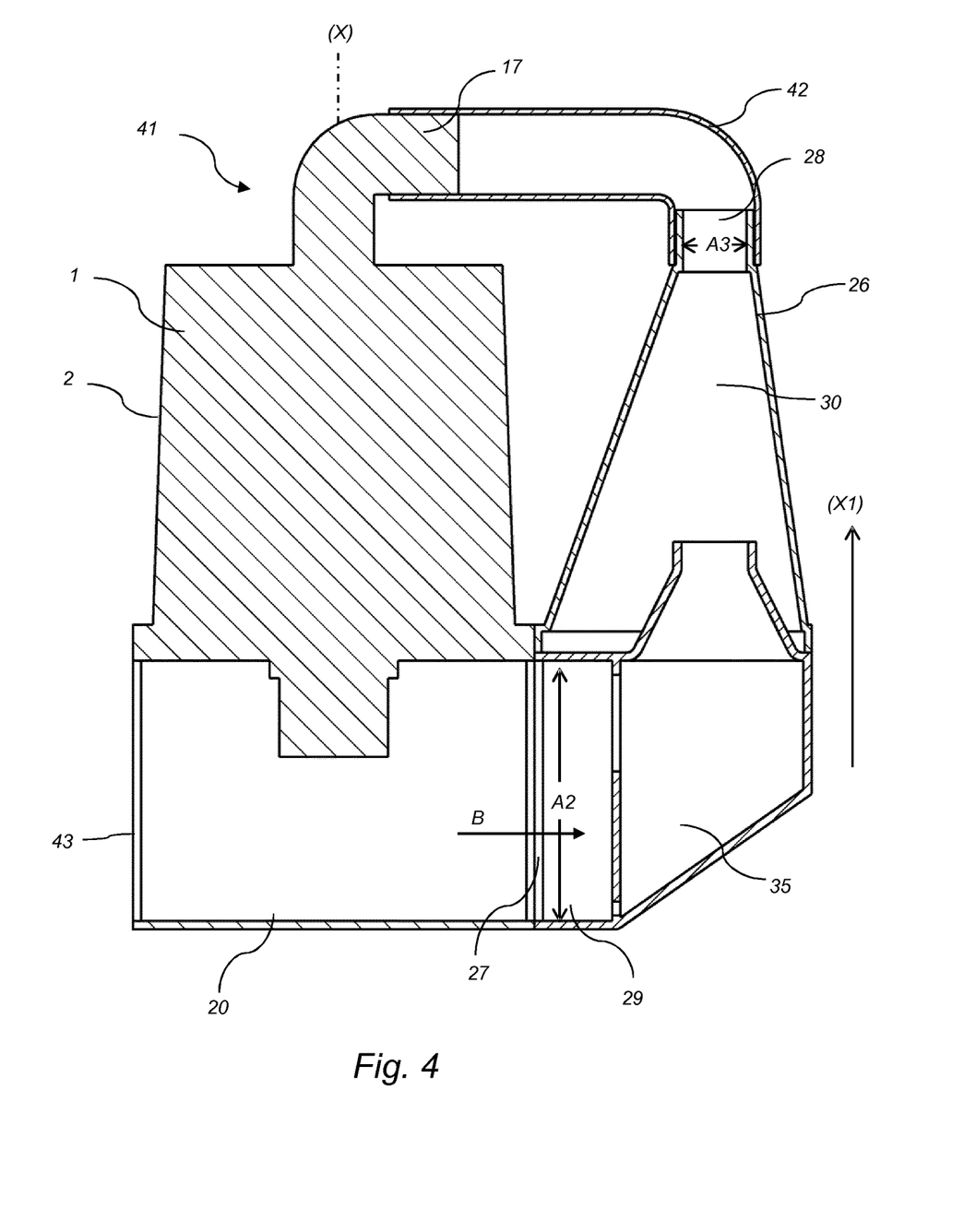
FIG. 4 shows a section of an embodiment of a separator arrangement.

FIG. 4 shows a section of an embodiment of a separator arrangement 41 comprising a centrifugal separator 1 and a pre-separation unit 26. In this embodiment, the centrifugal separator 1 is as shown in FIG. 1 and the pre-separation unit 26 is as shown in FIG. 2. For clarification, only the outline of separator 1 is shown in FIG. 4, and the features as shown and discussed in relation to FIG. 1 are not shown. The pre-separation unit 26 function as a single detachable unit that may be fitted onto the centrifugal separator. The pre-separation outlet 28 is fitted to the inlet conduit 17 of the centrifugal separator 1 via connection 42. The cross-sectional area A2 of the pre-separation inlet 27 is larger than the area A1 of the gas inlet of the centrifugal separator. As can be seen in FIG. 4, the cross-sectional area A3 of the pre-separation outlet 28 is substantially the same as the cross-sectional area of the inlet conduit 17. Furthermore, the pre-separation 26 unit is arranged in relation to the centrifugal separator 1 such that the axis X1, discussed in relation to FIG. 2 above, is substantially aligned with the rotational axis X of the centrifugal separator. Moreover, the inlet 27 of the pre-separation unit 26 is in flow connection to the turbine house 20 of the centrifugal separator 1, which means that gas to be cleaned is led from the turbine house 20 of the centrifugal separator 1, as indicated by arrow "B" in FIG. 4, through the pre-separation inlet 27 and subsequently through the first chamber 29, the third chamber 35 and the second chamber 30 of the pre-separation unit 26 before exiting the pre-separation outlet 28 and entering the separator inlet conduit 17 of the centrifugal separator 1. As an alternative, the inlet 27 of the pre-separation unit 26 may be mounted directly on the engine block of an engine.

Further, as an alternative to the embodiment shown in FIG. 4, the cone-shaped second chamber 30 of the pre-separation unit 26 may be integrated with the stationary casing 2 of the centrifugal separator 1.

The separator arrangement 41 may be mounted on an engine such that opening 43 faces the engine block or a connection to the engine block.

In the embodiment shown in FIG. 1 the rotating member 7 for the gas cleaning is provided with a stack of conical separation discs of a conventional kind. However, the invention is not limited to a rotating member or centrifugal rotor of precisely this kind but may be used in connection with any suitable centrifugal rotor for freeing a gas from particles suspended therein.

FIG. 5*a-d* shows a few examples of separation members that may be used in a centrifugal separator of the present disclosure. For clarity reasons, only a few discs are illustrated and it is to be understood that in reality, a larger number of discs are present so that the distance between the discs is much smaller.

Figure 5A:
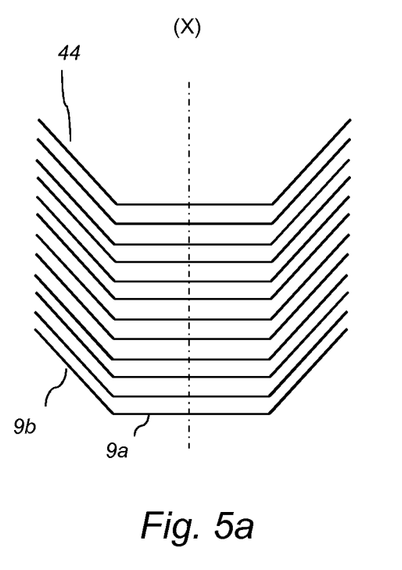
FIG. 5a-d show different types of separation members that may be used in the centrifugal separator.

FIG. 5*a* shows an example of frustoconical discs 44 having a flat portion 9*a* and a conical portion 9*b*. The flat portion 9*a* extends in a plane that is perpendicular to the axis of rotation (X), and the conical portion 9*b* extends in this embodiment upwards. The flat portion 9*a* is closer to the rotational axis than the conical portion 9*b*. The flat portion 9*a* and/or the conical portion 9*b* may comprise through holes for gas.

Figure 5B:
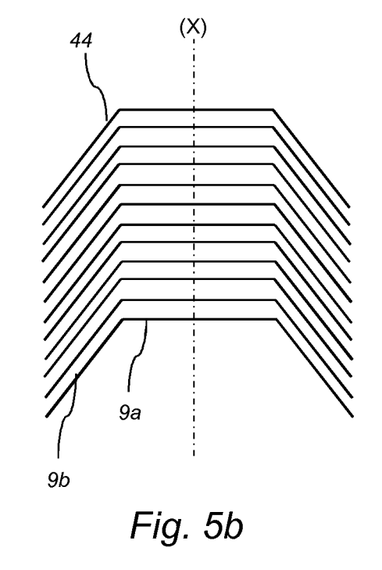

FIG. 5*b* shows an example of frustoconical discs 44 having a flat portion 9*a* and a conical portion 9*b*. The flat portion 9*a* extends in a plane that is perpendicular to the axis of rotation (X), and the conical portion 9*b* extends in this embodiment downwards. The flat portion 9*a* is closer to the rotational axis than the conical portion 9*b*. The flat portion 9*a* and/or the conical portion 9*b* may comprise through holes for gas.

Figure 5C:
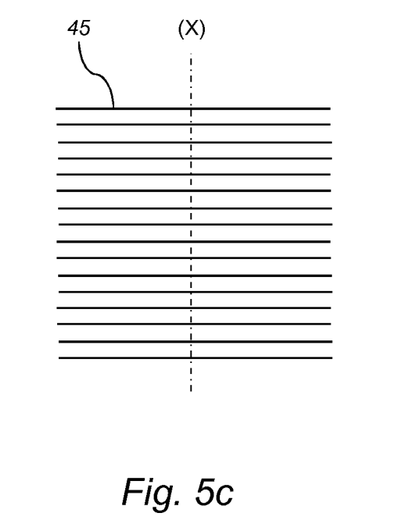

FIG. 5*c* shows an example of a disc stack in which all discs 45 are planar, i.e. all discs 45 extend in the plane that is perpendicular to the axis of rotation (X). The discs 45 may comprise through holes for gas.

Figure 5D:
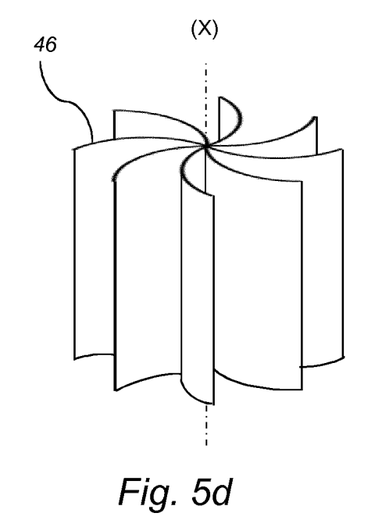

FIG. 5*d* shows an example of axial discs or plates 46. These plates 46 are slightly curved, i.e. they have a curved shaped as seen in a radial plane. In other words, they are curved as seen in a plane that is perpendicular to the axis of rotation (X). The axial discs 46 may comprise through holes for gas.

The invention is not limited to the embodiment disclosed but may be varied and modified within the scope of the claims set out below. The invention is not limited to the orientation of the axis of rotation (X) disclosed in the figures. The term "centrifugal separator" also comprises centrifugal separators with a substantially horizontally oriented axis of rotation.

The invention claimed is:

1. A separator arrangement for cleaning gas containing contaminants comprising:
    a centrifugal separator and a pre-separation unit,
    wherein the centrifugal separator comprises:
        a stationary casing, enclosing a separation space through which a gas flow is permitted;
        a gas inlet extending through the stationary casing and permitting supply of the gas from the pre-separation unit;
        a rotating member comprising separation members arranged in said separation space and being arranged to rotate around an axis of rotation;
        a drive member, for rotating the rotating member;
        a gas outlet configured to permit discharge of cleaned gas and comprising an outlet opening through a wall of the stationary casing; and
        a drainage outlet configured to permit discharge of liquid impurities separated from the gas to be cleaned, and
    wherein the pre-separation unit is arranged upstream of said gas inlet of said centrifugal separator, and said pre-separation unit comprises:
        a pre-separation inlet having a cross-sectional area and permitting supply of the gas to be cleaned, wherein the cross-sectional area is larger than a cross-sectional area of the gas inlet of the centrifugal separator;
        a pre-separation outlet for permitting supply of gas from the pre-separation unit to the gas inlet of the centrifugal separator; and
        a first chamber and a second chamber arranged downstream of said first chamber,
        wherein the first and second chambers of the pre-separation unit are separated by at least one intermediate wall comprising at least one through hole, and
        wherein the second chamber tapers in a cross sectional area between an inlet to the second chamber and the pre-separation outlet.

2. The separator arrangement according to claim 1, wherein the second chamber has a larger volume than the first chamber.

3. The separator arrangement according to claim 2, wherein the pre-separation unit further comprises a drainage outlet for oil that has been separated in the chambers of the pre-separation unit.

4. The separator arrangement according to claim 2, wherein the second chamber extends in the same direction as the axis of rotation.

5. The separator arrangement according to claim 1, wherein the pre-separation unit further comprises a drainage outlet for oil that has been separated in the chambers of the pre-separation unit.

6. The separator arrangement according to claim 5, wherein the second chamber extends in the same direction as the axis of rotation.

7. The separator arrangement according to claim 1, wherein the second chamber extends in the same direction as the axis of rotation.

8. The separator arrangement according to claim 1, wherein at least one intermediate wall of the pre-separation unit comprises at least one drainage hole for separated liquid impurities, and wherein said at least one drainage hole has a cross-sectional area that is smaller than the through hole of the intermediate wall.

9. The separator arrangement according to claim 8, wherein the at least one intermediate wall delimiting the second chamber and the chamber upstream of the second chamber is cone-shaped and comprises a through hole for gas in the narrowest portion of the cone-shape, and wherein said intermediate wall extends into the second chamber.

10. The separator arrangement according to claim 1, wherein the pre-separation inlet is arranged in a wall of the first chamber and the pre-separation outlet is arranged in a wall of the second chamber.

11. The separator arrangement according to claim 10, wherein the pre-separation unit comprises a third chamber arranged between said first and second chambers.

12. The separator arrangement according to claim 11, wherein the third chamber has a volume that is larger than the volume of the first chamber but smaller than the volume of the second chamber.

13. The separator arrangement according to claim 1, wherein the pre-separation unit further comprises a third chamber, the third chamber having an inlet communicating with the first chamber and an outlet communicating with the second chamber.

14. A method for cleaning a gas containing contaminants comprising the steps of:
   providing the separator arrangement according to claim 1;
   introducing gas containing contaminants into the pre-separation inlet of the pre-separation unit of the separator arrangement; and
   discharging cleaned gas through the gas outlet of the centrifugal separator and discharging contaminants separated from the gas through the drainage outlet of the centrifugal separator.

15. The method according to claim 14, wherein said gas containing contaminants is crankcase gas of a combustion engine and said contaminants comprise oil.

16. The method according to claim 14, wherein the gas containing contaminants is introduced into the pre-separation inlet of the pre-separation unit of the separator arrangement at a blow-by rate of at least 200 litres per minute.

17. A separator arrangement for cleaning gas containing contaminants comprising:
   a centrifugal separator and a pre-separation unit,
   wherein the centrifugal separator comprises:
      a stationary casing, enclosing a separation space through which a gas flow is permitted;
      a gas inlet extending through the stationary casing and permitting supply of the gas from the pre-separation unit;
      a rotating member comprising separation members arranged in said separation space and being arranged to rotate around an axis of rotation;
      a drive member, for rotating the rotating member;
      a gas outlet configured to permit discharge of cleaned gas and comprising an outlet opening through a wall of the stationary casing; and
      a drainage outlet configured to permit discharge of liquid impurities separated from the gas to be cleaned,
   wherein the pre-separation unit is arranged upstream of said gas inlet of said centrifugal separator, and said pre-separation unit comprises:
      a pre-separation inlet having a cross-sectional area and permitting supply of the gas to be cleaned, wherein the cross-sectional area is larger than a cross-sectional area of the gas inlet of the centrifugal separator;
      a pre-separation outlet for permitting supply of gas from the pre-separation unit to the gas inlet of the centrifugal separator; and
      a first chamber and a second chamber arranged downstream of said first chamber, wherein the first and second chambers of the pre-separation unit are separated by at least one intermediate wall comprising at least one through hole,
   wherein the drive member of the centrifugal separator comprises a turbine wheel arranged in a turbine house in the centrifugal separator, and
   wherein said pre-separation inlet faces said turbine house such that gas to be cleaned is led from the turbine house to the pre-separation unit.

18. A pre-separation unit for a centrifugal separator for cleaning gas containing contaminants, said pre-separation unit comprising:
   a pre-separation inlet having a cross-sectional area and permitting supply of the gas to be cleaned;
   a pre-separation outlet having a cross-sectional area for permitting supply of gas from the pre-separation unit to the inlet of the centrifugal separator, wherein the cross-sectional area of the pre-separation inlet is larger than the cross-sectional area of the pre-separation outlet; and
   a first chamber, and a second chamber arranged downstream of said first chamber, and a third chamber between the first chamber and the second chamber;
   a first partition wall dividing the first chamber from the third chamber, the first partition wall having a through hole allowing the gas to flow from the first chamber to the third chamber; and
   a second partition wall dividing the third chamber from the second chamber, the second partition wall having a through hole allowing the gas to flow from the third chamber to the second chamber,
   wherein the first chamber, second chamber and third chamber are arranged for permitting through flow of gas through the pre-separation unit, and
   wherein the second chamber has a larger volume than the first chamber.

19. The pre-separation unit according to claim 18, wherein a portion of the second partition wall is a cone extending into the second chamber.

20. The pre-separation unit according to claim 18, wherein a portion of the second partition wall separates the first chamber from the second chamber.

* * * * *